United States Patent Office 3,304,168
Patented Feb. 14, 1967

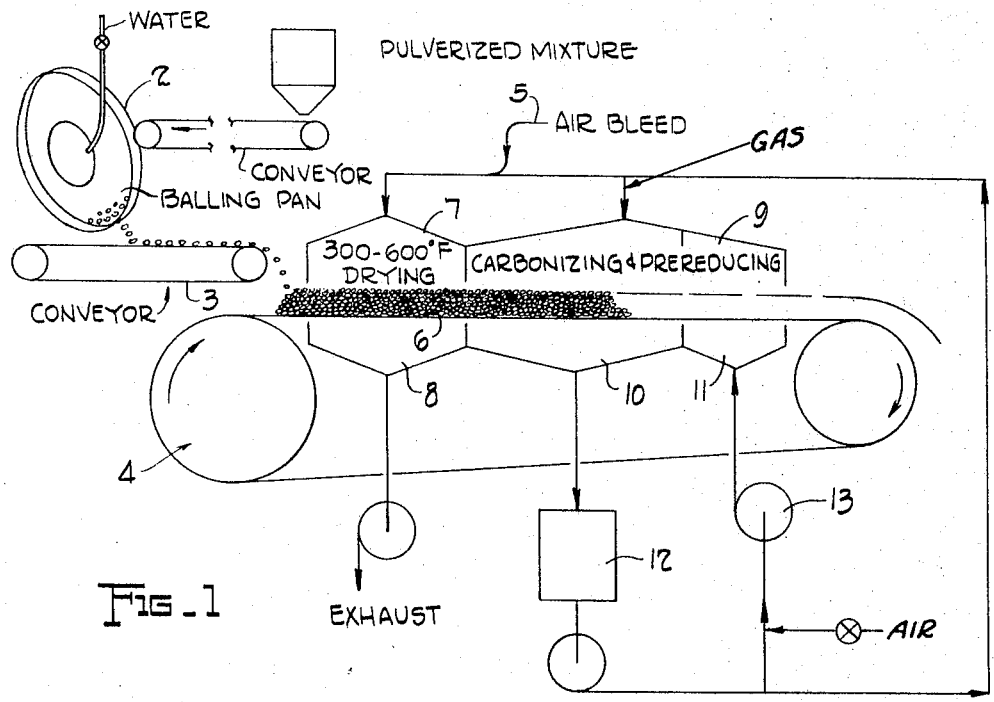
Fig_1
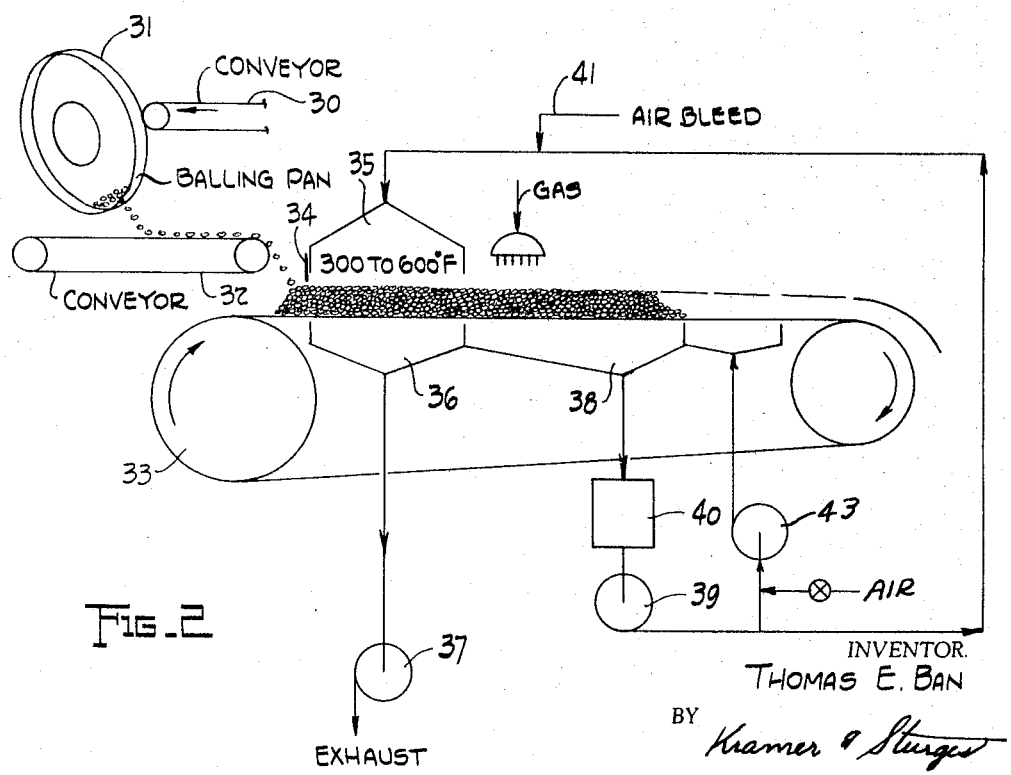
Fig_2
INVENTOR.
THOMAS E. BAN

3,304,168
SYSTEM FOR PRODUCING CARBONIZED AND PREREDUCED IRON ORE PELLETS
Thomas E. Ban, Cleveland Heights, Ohio, assignor to McDowell-Wellman Engineering Company, a corporation of Ohio
Filed Feb. 11, 1966, Ser. No. 526,879
7 Claims. (Cl. 75—3)

This application is a continuation-in-part of my co-pending application Serial No. 289,222 filed June 20, 1963, now abandoned.

This invention relates, as indicated, to an improved system for the production of carbonized and prereduced pellets of iron ore that contain a substantial percentage of iron in the reduced state.

In the prior processes for producing prereduced iron ore pellets, which pellets were then especially adapted for use in smelting processes for producing pig iron, it was customary to form pellets of relatively small particle sizes, and relatively high carbon concentration. It was found that this process tended to produce pellets which were fused or "clinkered." It has now been found that by increasing the size of the pellets to within the range of from about −1.5″+.5″, there can be produced prereduced iron ore pellets which have not become fused, i.e. are produced in the form of discrete pellets. It has also been found quite unexpectedly that by increasing the size of the pellets not only is the tendency of clinkering reduced, but the quantity of carbon required for the production of useful prereduced pellets may be cut from 15% to 35% thereby effecting considerable savings in fuel.

This process is further improved by utilizing an updraft of an oxidizing medium of relatively short duration at the termination of the processing. By such treatment, the pellet bed is rapidly and uniformly heated without excessive oxidation of the upper layers of the pellet bed. By "excessive oxidation" is meant re-oxidation of reduced iron values to higher oxidation states, and unnecessary oxidation of carbon.

The present process is also readily adapted to improved treating steps whereby, for example, substantially inert gases may be used in addition to or instead of oxidizing gases, e.g. air, and that by so operating the process, highly metallized iron ore pellets may be produced. The procedure by which such highly metallized pellets may be produced utilizing the large diameter pellets of the present invention, is the subject of my application, Serial No. 289,223 filed June 20, 1963, now Patent No. 3,264,092.

It has further been found that by this process, the capacity of a traveling grate machine when utilized for the purpose of producing prereduced pellets may be increased from 2 to 3 times over that which was previously obtained because the above conditions enable employment of high draft rates.

In brief, the present process for producing prereduced pellets involves the bringing together of powdered iron ore, powdered carbonaceous material, such as powdered coal, and powdered fluxing material, e.g. limestone, in predetermined amounts to form an intimate powdered mixture, pelletizing the mixture to form large balls having a particle size ranging from about .5″ to 1½″ in diameter, and indurating the pelletized mixture in a deep bed having a depth ranging from about 10″ to about 20″ on a traveling grate machine. The prereduced pellets produced by this process may be subjected to further metallization by proper regulation of the drafts passing through the deep bed burden. Alternatively, the prereduced pellets may be conveyed in the hot condition to a smelting apparatus for the immediate production of pig iron in accordance with standard procedures, or the prereduced pellets may be cooled and removed to a remote smelting site. This latter advantage enables the performance of the prereduction step at the mine site followed by transshipment in railroad cars or carrying vessels to a remote iron making plant.

One process for producing carbonized pellets as currently practiced involves the formation of green walls having a diameter of about ⅜″, that are applied to a traveling grate machine in a relatively thin layer of from 4 to 6 inches in depth. The green balls are initially dried for approximately 7 minutes, ignited with an open flame torch for about 1 minute, and then carbonized with a down draft of air applied at a rate of about 50 cubic feet per minute per square foot for a period of about 9 minutes. Experience has shown that the small pellets possess rather large total exposed surface area which cause carbon losses to the air draft, rather low reduction indices, and high flow rates at excessive temperatures cause clinkering. A separate source of gaseous flame ignition is required. The smaller pellets have more surface available for attrition losses, and the shallow bed is required to prevent over oxidation of the top layers while the bottom layers are becoming carbonized. Utilization of an air medium tends to cause more strongly oxidizing conditions to prevail which causes uncontrollable excessive heat from excessive combustion of carbon, and reoxidation of any reduced iron values, including metallic iron, which are formed. Also, continual down draft causes excessive heating of the grates and pallet members.

The present invention is an improvement in the above-mentioned conventional process for making pig iron and which overcomes in large measure the problems of the process as currently practiced, and additionally enables savings of up to 35% of the normal coal requirements.

When a deep bed is employed, and the heat front caused by ignition of the fixed carbon at the top surface moves downwardly through the bed, after the front has traversed ½ to ⅘ of the bed depth, the extent of the chemical reaction at the top surface is such that further reaction at that surface is oxidative in nature and free metal begins to be reoxidized. This undesirable effect in a deep bed is prevented by reversing the direction of gas flow through the bed. Homogeneity of the final product is thus secured and capacity is greatly increased. Still further, the composition of the hot gases after traversing ½ to ⅘ of the bed depth is such that the desired carbonization and prereduction to free metal becomes less efficient the farther the gases proceed into the bed from the entrance surface. Reversal of the gas direction when the heat front has traversed from about ½ to about ⅘ of the bed depth enables the production of a more homogeneous product throughout the bed than heretofore possible in beds of relatively great depth. Moreover, since the carbonaceous material is in intimate mixture with the iron ore throughout the pellet instead of concentrated at the surface, loss of carbon by burning is minimized and carbon sufficient to reduce the iron oxide to metallic iron is retained. A portion of the carbon in the pellet is utilized for this purpose during indurating of the pellets, and the remaining portion remains in the carbonized pellet and is sufficient to reduce the iron oxide remaining in the carbonized prereduced pellet to the free metal in the further processing of the pellets, as, for example, in a blast furnace.

In accordance with the present invention, large size green pellets are utilized having a diameter which is from about 2 to 4 times the diameter previously used. The green balls are applied in a layer which is also from 2 to 3 times as deep as the layer previously used, and dried with recycle draft gases. The bed may then be ignited with an open gas torch and ambient air drawn downwardly through the bed to yield a prereduced iron ore pellet.

Instead of an open torch for firing, the charge may be fired with a preheated draft of substantially neutral gas formed from gaseous combustion products and admixed with hot recycle gases from the carbonizing zone as acquired from an after-burner in the draft conduit system. As indicated above ambient air may, however, be used to yield a char-bonded product. After the carbonizing zone, the burden passes over a region where the draft, which may also be oxygen deficient, or air, is passed through the bed in a direction opposite to that in the preliminary carbonizing zone to cause bottom ignition of the bed. This is a reaction producing draft as distinguished from a cooling draft. A prereduced carbonized product is obtained which is then in condition for discharge directly into an electric furnace for the smelting operation. The mass may be submitted subsequently to a metallizing zone as above indicated where the pellets are hardened into metal bonded pellets in which 60% to 90% of the available metal is reduced to the metallic state.

Through this system of carbonization utilizing deep layered large balls reacted at high draft rates of gas, relatively high unit capacities of carbonization are obtained. The system is characterized by bed temperature control which is effected by regulation of the temperature and composition of the draft. Control of the excessive temperatures is obtained from the large sizes of the pellets which present a smaller surface area per unit of weight available for oxidation by the draft. Clinkering is also minimized because of the fewer points of contact obtained when large pellets are used instead of the smaller diameter pellets of the prior art practice. The pellets produced are char-bonded and contain a relatively high percentage of free iron in the form of minute discrete particles, and the amount of coal utilized is about 65% to 85% of that required according to the Case process. (Patent No. 2,806,799.)

In the annexed drawings:

FIG. 1 is a diagrammatic illustration and simplified flow sheet of one method for producing prereduced pellets in accordance with the present invention.

FIG. 2 is also a diagrammatic illustration and simplified flow sheet for another method of producing prereduced pellets in accordance with the present invention.

In accordance with the present invention a solid-gas reaction is caused to take place in a hot atmosphere to produce char-bonded pellets containing iron in the reduced metallic form to the extent of from about 15% to as high as about 45% of the available iron in the ore originally charged. The process known as the Dwight-Lloyd-McWane process produces prereduced pellets which contain iron in the reduced metallic state as discrete minute particles of iron to the extent of about 20% of the available iron and utilizes about 30% more carbon fuel than the present process. The amount of carbonaceous material used herein is that amount which contains fixed carbon in an amount at least sufficient to reduce 100% of the iron value of the ore to metallic iron and not more than 120% of such amount.

With more particular reference to the diagrammatic illustration of FIG. 1, the method here set forth contemplates the formation of green balls of iron ore with flux and carbonaceous matter, the relative amounts of the principal ingredients being so proportioned that under the conditions of the process, the individual balls are self-fluxing and self-reducing. For example, the composition of the burden utilizing a particularly high grade ore may be as follows:

| | Percent |
|---|---|
| Iron ore | 53 |
| Carbonaceous material (non-coking coal) | 30 |
| Limestone | 11 |
| Silica sand | 6 |

Under some circumstances, binding agents such as starch, sulphite liquor, lime, salts or bentonite can be used.

A chemical analysis of typical ingredients on a percentage basis is as follows:

CHEMICAL ANALYSES

| | Iron Ore | Coal | Limestone | Silica Sand |
|---|---|---|---|---|
| | Percent | Percent | Percent | Percent |
| $Fe_{total}$ | 69.94 | 2.00 | 0.30 | 0.12 |
| FeO | 27.89 | | | |
| $Fe_2O_3$ | 68.94 | 2.90 | 0.43 | 0.17 |
| $SiO_2$ | 1.41 | 5.59 | 3.18 | 97.33 |
| $Al_2O_3$ | 1.52 | 2.69 | 1.64 | 1.86 |
| CaO | 0.19 | 0.52 | 53.64 | 0.66 |
| MgO | 0.05 | 0.13 | 0.47 | |
| Sulphur | 0.004 | 0.67 | | |
| Vol. Matter | | 32.95 | | |
| Fixed Carbon | | 54.55 | | |
| Ash | | 12.50 | | |

The several ingredients are ground and blended to produce a granular mix, the particle sizes being that which is suitable for balling, and generally in the range of from about −325 mesh to about 10 mesh, preferably about from 48 mesh to 100 mesh. (Tyler.) The materials are prepared so that the blend is substantially −10 mesh and contains approximately 80% −100 mesh, with approximately 50% being −325 mesh. Individual size analyses of raw materials are not critical, and it is the physical composition of the blend which enables proper balling characteristics.

The several ingredients are thoroughly blended and conveyed to a balling apparatus 2. The balling apparatus 2 is a conventional pelletijing device of the rotating inclined pan or drum type. Once the pelletizing apparatus has been "stabilized," i.e., the operating conditions have been brought to equilibrium, the pellets which are produced are remarkably uniform in diameter. The term "green balls" or "green pellets" as used herein refers to the fact that the pellets or balls have not been dried or indurated, and identifies their moist condition upon leaving the balling apparatus. Reference may be had to Patent No. 2,947,026 which illustrates one form of pelletizing apparatus useful in forming pellets in accordance herewith. As indicated above, the average pellet diameter is preferably such that the pellets will pass through one inch square openings and be retained on a screen composed of ⅝ inch square openings. An average diameter of about ¾ inch is desired. Balls or particles which are smaller than the desired size are reworked by shredding and milling, e.g., in a pug mill, or returned to the balling disc for further rolling and size increasing. As above indicated, the pellets used in accordance herewith are larger than have heretofore been commercially utilized.

The green balls, containing moisture to the extent of about 10% to about 15% by weight, are conveyed by means of conveyor 3 to a conventional traveling grate machine 4. As is well known by those skilled in the art, this machine is an elongated trackway having supported thereon on wheels a plurality of individual traveling pallets each having a bottom formed of a plurality of grate bars, and having upstanding side walls. When the traveling grate members are progressing along a level portion of the trackway, they form a continuous channel and traveling grate. At the discharge extremity of the level portion, the individual pallets are carried by a terminal guide member to a return trackway in an inverted position and returned by the opposite sprocket member at the charging extremity to the normal upright position to repeat the cycle. The elongated straightened portion of the trackway is provided with contiguous hood portions surmounting the traveling pallets for the admission or removal of gases to or from the upper surface of the burden carried on the pallets. In coacting relation beneath the pallets and the burden are a plurality of contiguous wind boxes likewise adapted for the admission of gaseous material to or withdrawal of gaseous material from the burden.

These pellets are submitted first to a drying phase or zone defined by hood 7 coacting with windbox 8 by means of which heated gases at a temperature in the range of from about 300° F. to about 600° F., are passed through burden 6. These gases are derived from spent gases from another portion of the process. Because such spent gases are frequently at temperatures too high for proper drying, it is necessary to temper the recycle gases by admitting ambient air at 5 so that the temperature of the gases as admitted to the traveling bed 6 is within the desired range. As indicated above, the traveling bed 6 is much deeper than usual, i.e., from 10 to 20 inches deep. It is essential that the temperature of the drying gases be adjusted with respect to the composition of the green balls so that preignition of carbonaceous matter, and spalling or breaking up of the balls from rapid expansion of water vapor within the balls is minimized. Such spalling causes the formation of undesirable quantities of "fine." The flow rate of the drying gases is within the range of 200 to 300 s.c.f.m./sq. ft. of windbox area.

Following the drying phase, the dried pellets enter a carbonizing and prereducing zone defined by compound hood 9 and windboxes 10 and 11 where they are submitted to ignition by a heated draft passing through the deep bed at a rate of 100 s.c.f.m./sq. ft. to 200 s.c.f.m./sq. ft. and at a temperature sufficient to initiate and cause reaction between the solid phases comprising carbonaceous material, the oxygen, and the iron ore. These gases are heated externally of the machine by burning combustible gas in the gas stream, and also by igniting the gas withdrawn from the bed in an after-burner 12 and recycling at least a portion thereof by means of fan 13 for re-traverse of the bed or burden. The heat of the burden, then, results from the passage of the hot gases therethrough and from oxidation of a portion of the carbonaceous material.

While it is not practical to use entirely inert gases in the gas stream for the carbonizing and prereducing phases, such entirely inert gases, e.g., nitrogen, could easily be used. However, from a practical point of view oxygen-depleted air is most conveniently used and because of the presence of minor amounts of oxygen, e.g., 5% to 15% by volume therein and preferably 5% to 8% by volume, may be slightly oxidizing. Alternatively because of the presence therein of oxide of carbon, e.g., carbon monoxide, the gases may be slightly reducing in nature. Thus, by the term "substantially neutral" as used herein in reference to the gases which are passed through the burden, it is meant wholly neutral or inert gases as well as those practical gas compositions derived from air which may contain minor amounts, e.g., up to 5% to 15% by volume of either oxidizing components such as oxygen, or reducing components, such as carbon monoxide. As indicated, air may be added to aid in ignition and chemical reaction of the bed by the updraft.

As indicated in my co-pending application Serial No. 289,221, filed June 20, 1963, now Patent No. 3,264,091 if the passage of inert gases is continued for sufficient periods of time, the temperature of the pellet burden may be raised as high as about 2400° F. to 2500° F. at which temperature the reduction of the iron oxide is carried on to the extent of from about 10% to about 90% of the available iron in the charge, and the pellets go beyond the state of being "char-bonded" and become in fact metal bonded, or metallized.

The pellets treated in accordance with this invention may be charged directly into a smelting furnace or cooled and transported to a remote smelting installation. In either event, a major proportion of the reduction reaction has been permitted to take place on the traveling grate machine, and the fluxing or slag material is included with the resultant pre-reduced pellets. The pellets which issue from the traveling grate machine in accordance with this process are substantially entirely discrete and are, therefore, easily conveyed and handled in contradistinction to the clinkered product heretofore obtained.

While the process may be successfully practiced as above described, better results insofar as prereduction is concerned are obtained when there is utilized a change in direction of the draft of hot gases through the burden of pellets. By passing the gases through the bed in a direction opposite to the direction of passage of the carbonizing and prereducing gas, it is insured that the degree of reaction of the entire pellet burden is substantially the same at any level within the burden. Following the change in draft, further reduction and extensive metallizing of the pellets may be done in a zone immediately following the change of direction zone. For example, where the carbonization prereduction draft is a down draft at 100 s.c.f.m./sq. ft. to 200 s.c.f.m./sq. ft., the premetallizing draft is an updraft at 25 s.c.f.m./sq. ft. to 200 s.c.f.m./sq. ft. Thereafter the pellets may enter a heat soaking zone where the gases are passed downwardly therethrough. In a process so modified the extent of metallization is as indicated above in the range of from about 60% to about 90% of the available iron in the ore of the pellet burden.

In the methods described above for producing pellets, any type of carbonaceous matter may be incorporated as the reducing agent. To produce a char-bonded product, the reducing component should also include a tarry or asphatic material as the binder forming agent. When utilizing coke breeze, charcoal, lignite or anthracite, about 25% by weight of the coal of a high melting tarry residue should be added. Bituminous coal, which already contains such ingredient, requires no further additive.

In FIG. 2 there has been shown another process utilizing the improvements of the present invention, this showing being in diagrammatic form. The apparatus which is used is conventional. As shown in FIG. 2, then, a blend of powdered iron ore, powdered carbonaceous material, and powdered fluxing material of similar composition to that given above is conveyed by means of a conveyor 30 to a conventional inclined rotating pan balling apparatus 31. From the balling apparatus, green pellets having an average particle size within the range of from .5" to 1.5" are conveyed by means of a conveyor 32 to a conventional traveling grate machine 33. These relatively large green pellets are deposited on the grate to a depth which ranges from 10" to 20", conveniently 15", the bed depth being regulated by means of a gate 34 which can be adjusted to regulate the depth of the burden to a desired level.

The pellets are first submitted to a drying zone which is spanned by hood 35 and the co-operating windbox 36 disposed beneath the traveling grate. Draft recycle gases are passed through the bed at a temperature in the range of 300° F. to 600° F., the moisture laden gases being exhausted to the air by means of fan 37. The retention time of the pellets in this zone is regulated to be sure that the moisture content of the pellets is reduced below about 2% by weight of water, the rate of moisture withdrawal being such as to avoid spalling and disintegration of the pellets. Ordinarily, draft rates in the range of from 200 s.c.f.m. to 300 s.c.f.m. (standard cubic feet per minute per square foot of windbox area), and a retention time of about 8 to about 12 minutes within this zone will yield a satisfactory dry product.

The pellets are then submitted to ignition under an open gas flame torch. Windbox 38 disposed below the traveling grate in combination with fan 39 draws the hot gas downwardly into the burden and permits ignition of the carbon contained in the carbonaceous ingredient. It also causes the passage of ambient air downwardly through the burden because of the reduced pressure at the surface thereof caused by the fan 39. This enables the oxidation of the fuel to continue which provides heat to the burden and initiates partial reduction of the iron ore by means of reaction of such iron ore with carbon. Fan 43 provides an updraft at the end of the carbonization zone as in FIG. 1. The temperature of the burden in this zone reaches as much as 1800° F., and conversion of iron ore to free metallic iron may occur to the extent of about 15% to 40%. The iron so produced is in very finely divided particulate form, and the pellets are generally bonded by what is known as a "char-bond," and reoxidation of the reduced iron to an oxide of iron is at a minimum. These pellets are not as resistant to crushing forces as are the more highly metallized pellets described in accordance with the aforementioned co-pending application Serial No. 289,221. However, these pellets may be transferred directly to a smelting furnace or cooled and transshipped to a remote smelting furnace.

The air draft rate in the carbonizing and prereducing zone is in the range of from 100 s.c.f.m./sq. ft. of windbox area to 200 s.c.f.m./sq. ft. of windbox area and the bed temperature reaches a temperature in the range of 1800° F. to 2200° F. at the extremity of the carbonizing zone.

In order to utilize the heat values of the exhaust gases from the carbonizing zones, an after-burner 40 may be included in the line. These gases are recycled to the drying zone, and if necessary, air may be introduced at 41 to adjust the temperature of the drying gases to the proper point. The carbonizing gases contain oxygen to the extent of from about 15% to 23% by weight.

It has been found that in this process which is a modification of the Case process described and claimed in Patent No. 2,806,779 enables the utilization of much less coal or carbonaceous material, e.g. up to 35% less in the initial pelletizing mix, and also reduces the tendency to form clinker in the final product. Thus, the final product is obtained in the form of discrete pellets which have undergone some shrinkage in size, and which have undergone prereduction of the iron oxide content to form free discrete minute particles of iron cointained therein.

In general, the relative amount of carbon employed in these compositions is determined by the amount of reduction and hardening which is necessary to be carried out by the carbonaceous material. The carbonaceous material should contain free carbon and supply available carbon in an amount at least sufficient to convert all the iron oxide to metallic iron and provide the desired carbon content in the final pig iron, e.g. 3.5% C. A practical mode of computing the amount of carbonaceous material assumes that the available carbon reacts with the iron oxide to yield carbon monoxide instead of $CO_2$ or a mixture of $CO_2$ and CO. It is further assumed that only the fixed carbon content of the carbonaceous material undergoes reaction or is available therefore. A certain amount of the fixed carbon content is lost and assumed to be about 20%. Thus when the available carbon in the carbonaceous material is calculated and this stoichiometrically calculated against the iron ore for reduction to elemental iron, the amount so calculated is multiplied by 1.2 to account for losses of fixed carbon. The result divided by the percentage of fixed carbon in the carbonaceous material yields the amount of such material to be employed in a given formulation. Common materials contain about 55% fixed carbon. Ordinarily, from 25% to 50% by weight of the entire mixture of carbonaceous material is sufficient for this purpose, and most usually about 30% by weight.

What is claimed is:
1. The process of making hardened prereduced discrete unclinkered pellets of iron ore in a deep, high capacity, moving bed which contains from 15% to 40% of the available iron values in the metallic state, and which includes the steps of:
 (a) forming a particulate mixture of substantially uniform composition and consisting essentially of iron ore, a carbonaceous material, and a fluxing material, the amount of carbonaceous material including fixed carbon in an amount at least sufficient to reduce 100% of the iron oxide in said ore to free metal and not in excess of 120% of such amount;
 (b) forming moistened pellets of said mixture, said pellets having an average diameter of about minus 1.5 inch plus 0.5 inch;
 (c) charging said moistened pellets to a traveling grate to form a deep bed having a top and bottom surface and a depth of from 10 inches to 20 inches;
 (d) drying said bed in a drying zone by passing heated gases therethrough at a temperature of from about 300° F. to about 600° F., and at a rate of from about 200 to about 300 s.c.f.m./sq. ft. of windbox area;
 (e) conveying the resulting dried pellet bed to a carbonizing and prereducing zone;
 (f) heating said bed to carbonize and prereduce said pellets by passing gases through said bed from one surface to the other to raise the temperature of the bed at the heat front moving therethrough to from 1800° F. to 2200° F., the extent of prereduction of iron oxide to metallic iron being from about 15% to about 40% by weight of the iron values in the pellets, said gases passing through said bed at a rate of from about 100 to about 200 s.c.f.m./sq. ft of windbox area; and
 (g) before the heat front completely traverses the bed from one surface thereof to the other passing gases through the bed from one surface to the other in a direction opposite to the direction of the gases in the next preceding step to initiate an oppositely directed and moving carbonizing and prereducing heat front, whereby the extent of carbonization and prereduction of the pellets throughout the bed is substantially the same and reoxidation of metallic iron is maintained at a minimum.

2. The process of claim 1 wherein the gases utilized in the drying step are obtained by recycling gases exiting from the bed in the heating step (f).

3. The process of claim 1 which includes the step of igniting the bed with a flame after the pellets have traversed the drying zone.

4. The process of claim 3 in which the heating step (f) is effected by drawing air through the bed.

5. The process of claim 4 in which the gas of step (g) is a heated recycle gas from the heating step (f).

6. The process of claim 1 in which the gas of step (g) is a heated recycle gas from step (f).

7. The process of claim 6 in which the recycle gas is oxygen-depleted.

No references cited.

BENJAMIN HENKIN, *Primary Examiner.*